(12) United States Patent
Hoogland (10) Patent No.: US 7,230,756 B2
(45) Date of Patent: Jun. 12, 2007

(54) INTEGRATED OPTICAL SYSTEM FOR ENDOSCOPES AND THE LIKE

(75) Inventor: Jan Hoogland, Grants Pass, OR (US)

(73) Assignee: Integrated Endoscopy, Inc., Rancho Santa Margarita, CA (US)

( * ) Notice: Subject to any disclaimer, the term of this patent is extended or adjusted under 35 U.S.C. 154(b) by 0 days.

(21) Appl. No.: 11/226,864

(22) Filed: Sep. 14, 2005

(65) Prior Publication Data

US 2006/0193041 A1   Aug. 31, 2006

Related U.S. Application Data

(63) Continuation of application No. 10/397,827, filed on Mar. 25, 2003, now abandoned, which is a continuation of application No. 09/197,590, filed on Nov. 23, 1998, now Pat. No. 6,545,802, which is a continuation of application No. 08/687,910, filed on Jul. 30, 1996, now Pat. No. 5,841,578, which is a continuation of application No. 08/351,481, filed on Dec. 6, 1994, now Pat. No. 5,633,754.

(51) Int. Cl.
*G02B 23/24* (2006.01)

(52) U.S. Cl. .................. 359/435; 359/362; 359/434

(58) Field of Classification Search ........ 359/362–363, 359/434–435, 708; 600/162–176
See application file for complete search history.

(56) References Cited

U.S. PATENT DOCUMENTS 2,519,760 A   8/1950  Hett ........................... 359/367

(Continued)

FOREIGN PATENT DOCUMENTS

EP   0 558 278 A1   9/1993

(Continued)

OTHER PUBLICATIONS

Dobson et al, "The primary aberration characteristics of thin-lens models of common relay systems", Meas. Sci. Technol. 5 (Jan. 1994), pp. 32-36.*

(Continued)

*Primary Examiner*—Thong Q. Nguyen
(74) *Attorney, Agent, or Firm*—Knobbe Martens Olson & Bear LLP (57) ABSTRACT

Optical systems for endoscopes, borescopes, dental scopes, and the like which are characterized by having three groups of lenses of positive optical power and an external entrance pupil. Typically, all three groups of lenses are displaced from the pupil and focal planes. As a consequence, the displaced groups take part in the image transfer as well as in the pupil transfer. The optical power requirements can thus be shifted from one group to another, distributing as well as reducing the overall power requirement. Moreover, the aberration correction can also be shared between these groups. The first group, which conventionally has the highest optical power, and consequently a large amount of aberrations to be corrected, can in this way transfer some of the optical aberration correction to the other groups. The sharing of the optical functions and aberration correction results in a fully integrated optical system. The reduction in the total amount of optical power is so large that a line-of-sight deviating prism can be readily accommodated between the entrance pupil and the first lens group. The resulting simplicity of the optical system makes it suitable as a disposable item.

12 Claims, 3 Drawing Sheets

U.S. PATENT DOCUMENTS

| | | | |
|---|---|---|---|
| 4,140,364 A | 2/1979 | Yamashita et al. | 359/367 |
| 4,285,578 A | 8/1981 | Yamashita et al. | 359/644 |
| 4,300,812 A | 11/1981 | Nakahashi | 359/432 |
| 4,354,730 A * | 10/1982 | Bel | 359/434 |
| 4,354,734 A | 10/1982 | Nakahashi | 385/117 |
| 4,545,652 A | 10/1985 | Hoogland | 359/715 |
| 4,575,195 A | 3/1986 | Hoogland | 359/716 |
| 4,598,980 A | 7/1986 | Doi et al. | 359/735 |
| 4,730,909 A | 3/1988 | Takahashi | 359/735 |
| 4,755,029 A | 7/1988 | Okabe | 359/654 |
| 4,784,118 A * | 11/1988 | Fantone et al. | 600/160 |
| 4,822,154 A | 4/1989 | Oxford et al. | 359/367 |
| 4,964,710 A * | 10/1990 | Leiner | 600/162 |
| 4,984,878 A | 1/1991 | Miyano | 359/783 |
| 4,993,817 A | 2/1991 | Hoogland | 359/708 |
| 5,005,957 A * | 4/1991 | Kanamori et al. | 359/708 |
| 5,005,960 A | 4/1991 | Heimbeck | 359/435 |
| 5,059,009 A | 10/1991 | McKinley | 359/435 |
| 5,206,759 A * | 4/1993 | Ono et al. | 359/434 |
| 5,257,133 A | 10/1993 | Chen | 359/435 |
| 5,327,283 A | 7/1994 | Zobel | 359/565 |
| 5,341,240 A | 8/1994 | Broome | 359/434 |
| 5,359,453 A | 10/1994 | Ning | 359/435 |
| 5,412,504 A | 5/1995 | Leiner et al. | 359/434 |
| 5,416,634 A | 5/1995 | Ning | 359/435 |
| 5,444,569 A | 8/1995 | Broome | 359/435 |
| 5,625,488 A | 4/1997 | Dietzsch et al. | 359/435 |
| 5,633,754 A | 5/1997 | Hoogland | 359/434 |
| 5,731,916 A | 3/1998 | Ono | 359/293 |
| 5,841,578 A | 11/1998 | Hoogland | 359/435 |
| 5,902,232 A * | 5/1999 | Igarashi | 600/176 |
| 5,933,275 A | 8/1999 | Igarashi | 359/435 |
| 6,545,802 B2 * | 4/2003 | Hoogland | 359/435 |
| 6,853,485 B2 | 2/2005 | Hoogland | 359/435 |

FOREIGN PATENT DOCUMENTS

| | | |
|---|---|---|
| FR | 1450280 | 8/1966 |
| GB | 2267762 | 12/1993 |
| JP | 63 301015 | 12/1988 |
| WO | WO 92/19008 | 10/1992 |

OTHER PUBLICATIONS

Nintendo surgery. M. Thomas Optics and Phot. News, Jul. 1994, pp. 6-7.

U.S. Appl. No. 11/052,722, filed on Feb. 7, 2005 (our reference INTEGR.002C1).

U.S. Appl. No. 10/397,827, filed on Mar. 25, 2003 (our reference INTEGR.1C2C1).

U.S. Appl. No. 09/511,662, filed on Feb. 23, 2000 (our reference INTEGR.002A).

Excerpt from book by Warren Smith, *Modern Optical Engineering: the design of optical systems*, copyright 1990, pp. 151-154, 239-241 and 335.

* cited by examiner

FIG. 11 ns as separate entities is that the distribution of the optical powers is very uneven and that certain aberrations are naturally at a maximum, like astigmatism, field curvature, and chromatic aberrations. The correction of these aberrations require relatively short radii. These short radii are difficult to fabricate, require tight tolerances, and they are therefore the main contributors to the considerable cost of the fabrication of an endoscope. A truly inexpensive endoscope, sufficiently inexpensive to be offered as a disposable item, is presently not practical with conventional designs.

INTEGRATED OPTICAL SYSTEM FOR ENDOSCOPES AND THE LIKE

PRIORITY APPLICATION

This application is a continuation application of U.S. patent application Ser. No. 10/397,827, filed Mar. 25, 2003, now abandoned which is a continuation of U.S. patent application Ser. No. 09/197,590, filed Nov. 23, 1998, now U.S. Pat. No. 6,545,802, which is a continuation application of U.S. patent application Ser. No. 08/687,910, filed Jul. 30, 1996, now U.S. Pat. No. 5,841,578, which is a continuation of U.S. patent application Ser. No. 08/351,481, filed Dec. 6, 1994, now U.S. Pat. No. 5,633,754, each of which is hereby incorporated herein by reference in their entirety.

FIELD OF THE INVENTION

The present invention relates generally to optical lens systems, and more particularly to lens systems suitable for endoscopes and the like.

BACKGROUND OF THE INVENTION

In endoscopy and related fields, such as borescopes and dental scopes, the complete optical system is thought of as consisting of four basic and separate optical functions. Those functions are, in sequence of the direction of the travelling light, as follows:

1. an objective which forms the first image of an object under surveillance,
2. a field lens which images the pupil of the objective onto the next image transfer lens,
3. an image transfer lens which reimages the first image onto the next field lens. The pupil and image transfer steps are repeated as often as is needed to obtain a desired tube length, and
4. a focussing lens which presents the final image to a sensor, like a person's eye, a CCD camera, or a photographic film.

This approach is the classical approach, and it is appropriate for the following reasons:

1. The design of the optical system is broken up into parts with single and clearly defined and separate functions, functions to each of which an optical designer may bring considerable experience, and
2. The light transfer capacity and information transfer capacity of an endoscope is at a maximum when the optical power is concentrated at the image planes and pupil planes. The expedience of this approach is brought out by numerous U.S. patents on endoscopes which consistently treat the objective, the relay system, and the eyepiece as separate parts of the total system.

The disadvantage of treating the different optical compo-

SUMMARY OF THE INVENTION

The present invention provides an integrated optical system suitable for endoscopes, borescopes, dental scopes, and the like which contains a minimum of elements and which elements have relatively long radii and need not be of a meniscus shape. The outside entrance pupil location is very suitable for a tapered probe or for concealment. The entrance pupil distance sufficient to accommodate a line-of-sight deviating prism is a natural consequence of the arrangement of the optical groups. The system leads itself to mass production and is highly insensitive to tilt and decentration of its components. As a consequence it is eminently suitable as a disposable item.

Broadly, the foregoing advantages are achieved in a lens system which is characterized by an integrated design which has an external entrance pupil and in which the majority of the groups are displaced from the image planes and pupil planes. In this way most components share in the pupil transfer as well as in the image transfer. Moreover, the aberration correction is distributed in an advantageous way over all the groups, providing relief to the first group which conventionally is in need of most of the aberration correction. It has been found that this integration of the optical functions and aberration correction is very beneficial in that it greatly simplifies the optical system.

A plano-convex lens, or even a double convex lens when used according to the invention can be corrected for astigmatism since it is displaced from the stop location. In this way no optical surfaces of very short radii are needed to correct the astigmatism of the total optical system. Furthermore, the spherical aberration of a convex-plano lens used in the present invention is very near the minimum possible for a single element. Also the chromatic aberration is greatly reduced by the displacement of the elements from the image planes and pupil planes as a comparison with the classical arrangement will readily show. A factor two to four in the reduction of the chromatic aberration is thus achieved without the presence of a chromatic aberration reducing element, sometimes making further color correction unnecessary. Even a system incorporating several transfers is fully color corrected by the use of a single color correcting element. The distortion, which is usually very high in the objective, is corrected at more convenient and effective places. The result is a single integrated system which replaces the three conventional separate parts, i.e. the objective, the field lens, and a relay lens. This single integrated system may be augmented, as is well known in the art of optical design, with additional optics, like a close-up lens, a field expander, a field flattening lens, or with additional relay groups, without falling outside the scope of the invention.

DETAILED DESCRIPTION OF THE PREFERRED EMBODIMENT

The illustrative embodiments to be described below are standardized to a length of about 100 millimeters of the basic optical system and mostly for a nominal magnification of unity. In this way the performance of the various examples can be conveniently compared. Embodiments with other magnifications, field of views, numerical apertures, and with additional relays are presented in order to show that the general concept of the invention is effective over a wide range of applications. The embodiments use conventional, non-GRIN (graded refractive index) lens elements, and thus each lens has a uniform refractive index. In FIGS. 1 through 11 the object and image planes are indicated by an 'O' and 'Im', respectively and the pupil planes by a 'P'. The optical system features of object plane, pupil plane, lens surfaces and final image plane are numbered sequentially. Table I through XI present the constructional parameters of the preferred embodiments illustrated in corresponding FIGS. 2–11 and the prior art embodiment illustrated in FIG. 1. All dimensions are in millimeters. The first column indicates the surface number shown in the figures, the second column indicates the radii, and the third column indicates the axial separations. The refractive indices and dispersion are presented in the usual manner, with respect to the e, F', and C' spectral lines. The aspheric data are presented in the standard manner. The surface and plane numbers refer to those in the figures. Table I refers to the system shown in FIG. 1, Table II to the system of FIG. 2, and so on for the other tables and figures.

Figure 1:
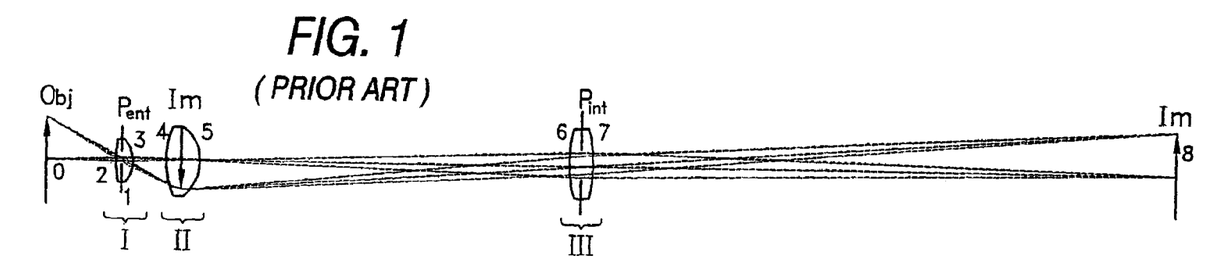
FIG. 1 is an optical schematic view of an endoscope constructed in accordance with a conventional layout in which each component has a single function in the system.

FIG. 1 is an optical schematic of an endoscope which is constructed in accordance with the classical concept of separation of the various functions. Group I is an objective which contains the entrance pupil plane while group II represents a field lens which is located at the focal plane of the objective. Group III represents a transfer lens which transfers the image formed by the objective unto a next focal plane. All groups are located at pupil planes or focal planes. It is apparent from the drawing as well as from the data of Table XII that the distribution of optical power is very uneven. The value of the sum of the absolute values of the curvatures, which is a measure of difficulty of fabrication, is listed in Table XII for this version which is uncorrected for chromatic aberrations. A version corrected for chromatic aberration would have more than double the value for the sum of the curvatures. The pertinent performance data are listed in Table XII and the constructional parameters are listed in Table I.

Figure 2:
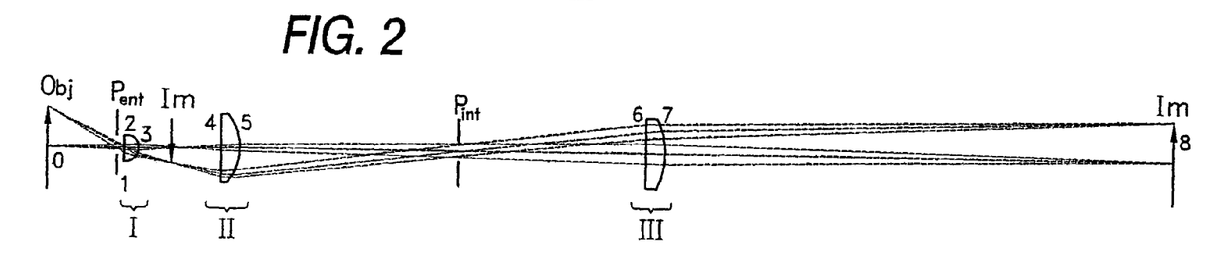
FIG. 2 is an optical schematic view of a first preferred embodiment in which the entrance pupil is located outside the first group by a relatively small distance.

FIG. 2 is an optical schematic of an endoscope of extreme simplicity. Only three plastic elements on non-meniscus shape and devoid of steep curves are needed to provide diffraction limited performance for the monochromatic aberrations. Many applications do not require a line-of-sight deviating prism and in such cases a pencil-shaped tip, which is often an advantageous configuration, can be readily provided. The pertinent performance data are listed in Table XII and the constructional parameters are listed in Table II.

Figure 3:
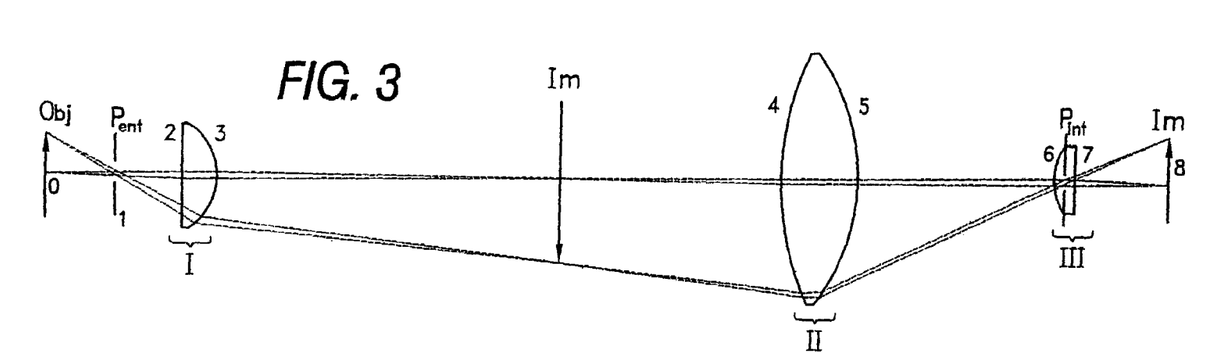
FIG. 3 is an optical schematic view of a second preferred embodiment in which full advantage of the power reduction and aberration reduction is taken by locating the entrance pupil outside the first group by a large distance.

FIG. 3 is an optical schematic of an endoscope which is also extremely simple in construction but is nevertheless highly corrected for all aberrations, including chromatic aberrations. Although no negative element has been added to correct chromatic aberration, the chromatic aberration is more than a factor four smaller than in the classical layout (c.f. FIG. 1) and is within the diffraction limit. This example clearly shows the advantage which a redistribution of power, with the attendant shift of pupil ($P_{int}$) location, brings. This somewhat extreme case is achieved at the cost of larger optical components.

Figure 4:
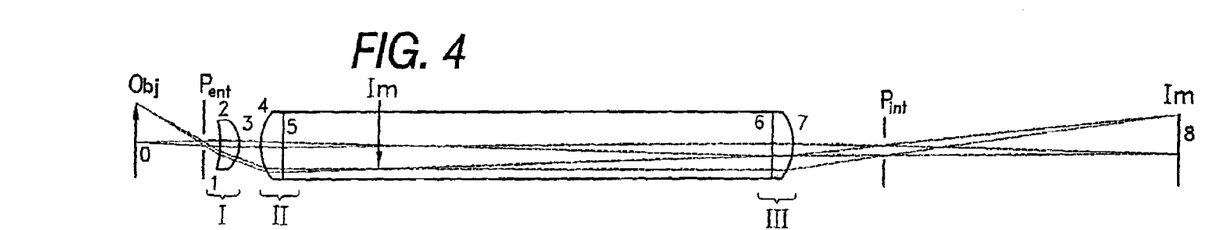
FIG. 4 is an optical schematic view of a third preferred embodiment which incorporates a rod-shaped element.

FIG. 4 is an optical schematic of an endoscope which consists of only two components. The second and third groups are cemented to a rod-shaped element, so that there are only four glass/air surfaces. Despite its simplicity, all aberrations are at the diffraction limit. This example shows that rod-shaped elements can be profitably employed in the present invention. It also shows that rod-shaped elements may alter the location of the intermediate pupil plane ($P_{int}$) and focal plane of the objective, which have now moved beyond the third and second groups, respectively. A shorter rod-shaped element can put the intermediate focal and pupil planes ($P_{int}$) at the second (II) or third (III) element if so desired. The exemplary embodiments do not require meniscus-shaped optical elements. This does not, of course, preclude their use, as is shown in this example. The gain in using meniscus shapes, however, is modest.

Figure 5:
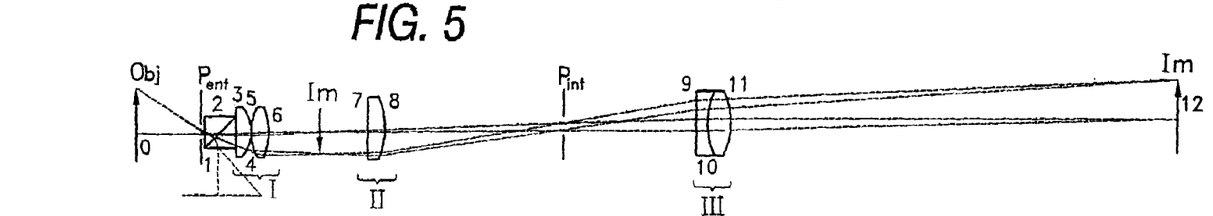
FIG. 5 is an optical schematic of a fourth preferred embodiment of all glass elements which incorporates a single negative element which provides chromatic aberration correction of the whole system.

FIG. 5 is an optical schematic of an endoscope which is entirely constructed of glass elements, none of which are of the meniscus shape. All curvatures are shallow and of a spherical shape only. The first group provides without any strain the needed space for a line-of-sight deviation prism between the entrance pupil and the first group, even in the case of a large field of view of seventy degrees. It is important to note that, despite the fact that the first group is not color corrected in any way, the chromatic aberrations of the whole system are fully corrected by means of a single negative element only. All three groups are far removed from the intermediate image plane and the pupil plane, showing the full integration of the three groups. The pertinent performance data are listed in Table XII and the constructional parameters are listed in Table V.

Figure 6:
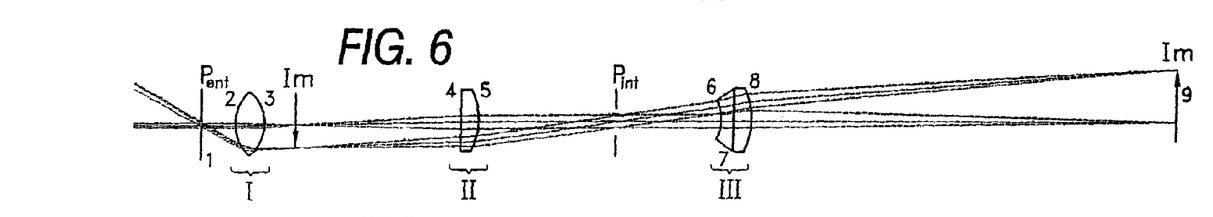
FIG. 6 is an optical schematic of a fifth preferred embodiment of a simple glass & plastic system with full correction of chromatic aberration.

FIG. 6 is an optical schematic of an endoscope which is partly constructed of glass and partly of plastic. Again no steep curves nor meniscus elements are needed to achieve the relatively high N.A. of 0.025. The distortion is well corrected. The object distance has been set at infinite distance to show that the basic design is not affected by a change in magnification as is generally the case with endoscopes. The pertinent performance data are listed in Table XII and the constructional parameters are listed in Table VI.

Figure 7:
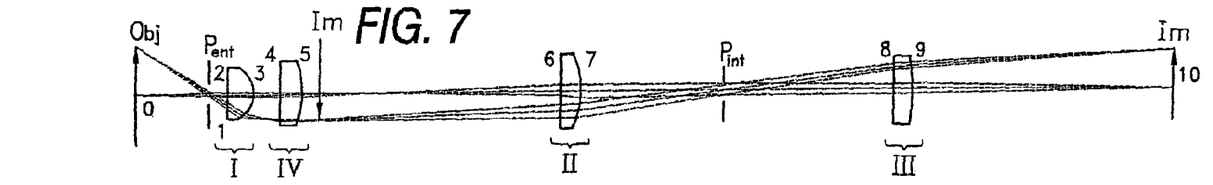
FIG. 7 is an optical schematic view of a sixth preferred embodiment in which the three basic groups have been augmented by an element near the focal plane of the first group.

FIG. 7 is an endoscope to which one more groups of optical power have been added, resulting in a modestly improved monochromatic performance. The added element is positioned close to the image plane of the objective where it is most effective. Its relative weak, in this case positive, power shows that most of the burden of the optical functions as well as the aberration correction is carried by the groups which are displaced from the image planes and pupil planes. This example shows that an additional element near an image plane or a pupil plane is not excluded. The pertinent performance data are listed in Table XII and the constructional parameters are listed in Table VII.

Figure 8:
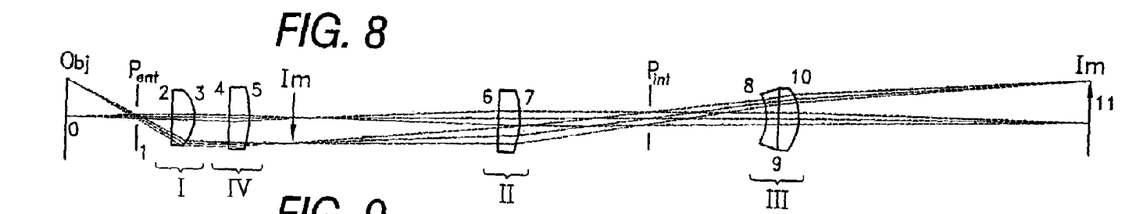
FIG. 8 is an optical schematic view of a seventh preferred embodiment in which a fourth element of low optical power has been added near the focal plane of the first group and which contains a single negative element for correcting the chromatic aberrations.

FIG. 8 is a highly corrected endoscope of all plastic elements with a relatively high N.A. of 0.025. Only one of the elements, the second element, favors a position which is close to an image or pupil plane but is again of low optical power. The pertinent performance data are listed in Table XII and the constructional parameters are listed in Table VIII.

Figure 9:
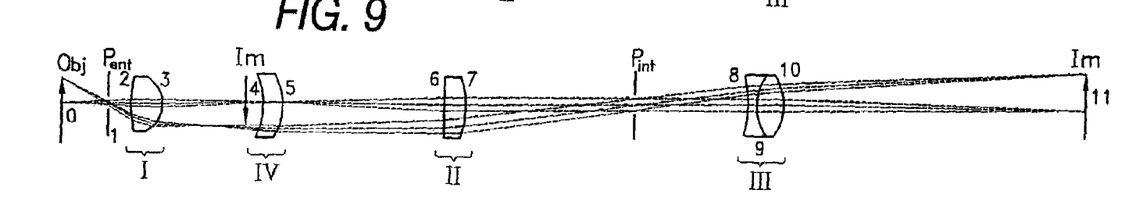
FIG. 9 is an optical schematic of an eighth preferred embodiment which incorporates a meniscus shaped element.

FIG. 9 is an endoscope of similar design as the one shown in FIG. 8. The magnification has been increased to 2×, showing that the design remains very similar to the 1× and 0.0× designs, as is generally the case with endoscopes. Again a meniscus element has been employed to show that despite the fact that the present invention can be very well executed with non-meniscus elements, their employment is by no means excluded. In this case the fourth group, the meniscus element is of negative power, again showing that the fourth element is a non-essential addition to the three group concept of the invention. The pertinent performance data are listed in Table XII and the constructional parameters are listed in Table IX.

Figure 10:
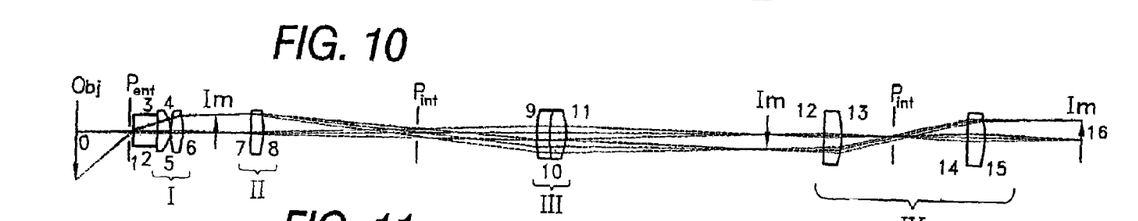
FIG. 10 is an optical schematic view of a ninth preferred embodiment which incorporates a second image relay and is fully corrected for chromatic aberrations with a single element of negative optical power.

FIG. 10 is an endoscope to which a second relay has been added. It has a very large field of view of eighty degrees and a relatively high N.A. of 0.025. Despite these large values a deviation prism can be readily accommodated in between the objective and the entrance pupil. The total system is still very well corrected and needs only a single color correcting element of low power in order to provide full correction of the chromatic aberrations. As the first three groups are fully correctable by themselves, the addition of classical relays to those first three groups is not excluded. The pertinent performance data are listed in Table XII and the constructional parameters are listed in Table X. Note that the second relay is different from the first relay. The number of curved optical surfaces in the second relay is different than the number of curved optical surfaces in the first relay.

Figure 11:
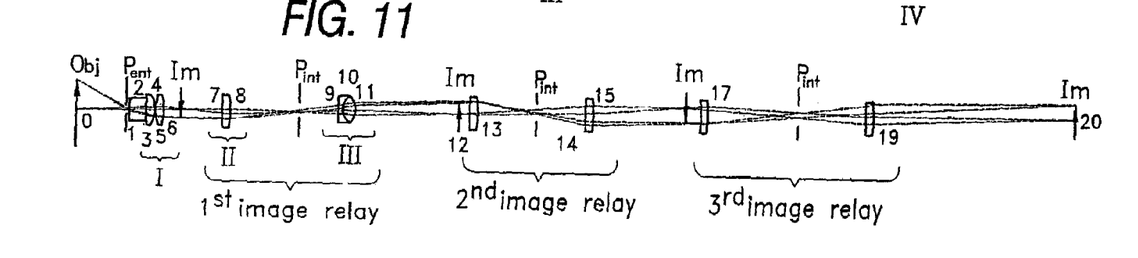
FIG. 11 is an optical schematic view of a tenth preferred embodiment which incorporates a third image relay and is still fully corrected for chromatic aberrations using only one element of negative optical power.

FIG. 11 shows an endoscope with three image relays and is still very well corrected. Again the chromatic aberrations are fully corrected with a single element of negative optical power. In this case the optical power of the color correcting element approaches a value comparable to those of the other components. All elements are of glass and no aspheric surfaces are employed. The pertinent performance data are listed in Table XII and the constructional parameters are listed in Table XI. Note that the second relay is different from the first relay. The number of curved optical surfaces in the second relay is different than the number of curved optical surfaces in the first relay.

It is thus evident from these embodiments that the integration of the three groups of which a conventional endoscope exists, the objective, a field lens, and a relay lens, greatly reduces the overall power requirement. The reduction in the overall power requirement naturally reduces the amount of aberrations to be corrected which results in a considerable simplification of the optical system. An additional, and in many cases a very valuable, feature is that the optimal location of the entrance pupil is outside the system.

TABLE I

| SURF | RD | TH | INDEX | v-VALUE | CC |
|---|---|---|---|---|---|
| 0 | | 6.51 | OBJECT PLANE | | |
| 1 | | -.51 | ENTRANCE PUPIL PLANE | | |
| 2 | 2.60 | 1.40 | 1.4938 | 57.0 | -52.0 |
| 3 | -1.60 | 3.00 | AIR | | -7.5 |
| 4 | 4.00 | 3.00 | 1.4938 | 57.0 | -12.0 |
| 5 | -3.80 | 33.00 | AIR | | |
| 6 | 18.00 | 2.00 | 1.4938 | 57.0 | |
| 7 | -24.76 | 51.64 | AIR | | |
| 8 | | | IMAGE PLANE | | |

EFL = -5.518
.020 N.A.
60 DEG F.O.V.
MAGN = 1.000

TABLE II

| SURF | RD | TH | INDEX | v-VALUE | CC |
|---|---|---|---|---|---|
| 0 | | 6.00 | OBJECT PLANE | | |
| 1 | | .60 | ENTRANCE PUPIL PLANE | | |
| 2 | infinity | 1.2 | 1.4938 | 57.0 | |
| 3 | -1.10 | 7.4 | AIR | | -.40 |
| 4 | infinity | 1.5 | 1.7762 | 49.3 | |
| 5 | -6.30 | 36.80 | AIR | | |
| 6 | infinity | 1.50 | 1.4938 | 57.3 | |
| 7 | -11.81 | 44.85 | AIR | | -3.00 |
| 8 | | | IMAGE PLANE | | |

EFL = -5.543
.020 N.A.
60 DEG F.O.V.
MAGN = 1.000

TABLE III

| SURF | RD | TH | INDEX | v-VALUE | CC |
|---|---|---|---|---|---|
| 0 | | 6.00 | OBJECT PLANE | | |
| 1 | | 6.00 | ENTRANCE PUPIL PLANE | | |
| 2 | infinity | 3.00 | 1.4938 | 57.0 | |
| 3 | -4.7 | 51.30 | AIR | | -.65 |
| 4 | 25.70 | 7.00 | 1.4938 | 57.0 | |
| 5 | -11.70 | 18.00 | AIR | | -2.90 |
| 6 | 7.00 | 2.00 | 1.4938 | 57.0 | |
| 7 | -13.48 | 6.72 | AIR | | -560.00 |
| 8 | | | IMAGE PLANE | | |

EFL = -3.216
.020 N.A.
60 DEG F.O.V.
MAGN = 1.000

TABLE IV

| SURF | RD | TH | INDEX | v-VALUE | CC |
|---|---|---|---|---|---|
| 0 | | 6.00 | OBJECT PLANE | | |
| 1 | | 2.00 | ENTRANCE PUPIL PLANE | | |
| 2 | -5.00 | 1.80 | 1.4938 | 57.0 | |
| 3 | -2.10 | 1.70 | AIR | | -.56 |
| 4 | 5.83 | 2.00 | 1.6203 | 63.1 | |
| 5 | infinity | 48.00 | 1.8126 | 25.2 | |
| 6 | infinity | 2.00 | 1.4938 | 57.0 | |

TABLE IV-continued

| SURF | RD | TH | INDEX | v-VALUE | CC |
|------|-------|-------|-------|---------|-------|
| 7 | −7.01 | 36.50 | AIR | | −1.30 |
| 8 | | | IMAGE PLANE | | |

EFL = −4.846
.020 N.A.
60 DEG F.O.V.
MAGN = 1.000

TABLE V

| SURF | RD | TH | INDEX | v-VALUE | CC |
|------|--------|-------|--------|---------|----|
| 0 | | 6.00 | OBJECT PLANE | | |
| 1 | | .20 | ENTRANCE PUPIL PLANE | | |
| 2 | infinity | 3.00 | 1.7162 | 53.2 | |
| 3 | infinity | 1.50 | 1.7762 | 49.3 | |
| 4 | −4.0 | .20 | AIR | | |
| 5 | 13.50 | 1.50 | 1.7762 | 49.3 | |
| 6 | −13.50 | 9.50 | AIR | | |
| 7 | infinity | 1.50 | 1.7762 | 49.3 | |
| 8 | −10.9 | 30.80 | AIR | | |
| 9 | infinity | 1.20 | 1.8097 | 30.2 | |
| 10 | 8.80 | 2.00 | 1.5914 | 61.0 | |
| 11 | −8.47 | 42.55 | AIR | | |
| 12 | | | IMAGE PLANE | | |

EFL = −5.495
.017 N.A.
70 DEG F.O.V.
MAGN = 1.000

TABLE VI

| SURF | RD | TH | INDEX | v-VALUE | CC |
|------|----------|-------|--------|---------|-------|
| 0 | infinity | | OBJECT PLANE | | |
| 1 | | 3.2 | ENTRANCE PUPIL PLANE | | |
| 2 | 4.90 | 2.5 | 1.4938 | 57.0 | −1.50 |
| 3 | −2.90 | 18.60 | AIR | | −2.50 |
| 4 | infinity | 2.00 | 1.4938 | 57.0 | |
| 5 | −8.80 | 24.00 | AIR | | −.70 |
| 6 | −7.00 | 1.20 | 1.5901 | 29.6 | 1.40 |
| 7 | infinity | 2.00 | 1.6543 | 58.3 | |
| 8 | −6.55 | 40.51 | AIR | | |
| 9 | | | IMAGE PLANE | | |

EFL = −7.794
.025 N.A.
60 DEG F.O.V.
MAGN = .000

TABLE VII

| SURF | RD | TH | INDEX | v-VALUE | CC |
|------|----------|-------|--------|---------|--------|
| 0 | | 6.00 | OBJECT PLANE | | |
| 1 | | 1.90 | ENTRANCE PUPIL PLANE | | |
| 2 | infinity | 2.50 | 1.4938 | 57.0 | |
| 3 | −2.00 | 2.70 | AIR | | −.66 |
| 4 | infinity | 2.00 | 1.4938 | 57.0 | |
| 5 | −16.80 | 25.00 | AIR | | 32.00 |
| 6 | infinity | 2.00 | 1.4938 | 57.0 | |
| 7 | −9.60 | 31.20 | AIR | | −1.20 |
| 8 | infinity | 2.00 | 1.4938 | 57.0 | |
| 9 | −17.85 | 24.68 | AIR | | −28.00 |
| 10 | | | IMAGE PLANE | | |

EFL = −5.301
.020 N.A.
70 DEG F.O.V.
MAGN = 1.000

TABLE VIII

| SURF | RD | TH | INDEX | v-VALUE | CC |
|------|----------|-------|--------|---------|-------|
| 0 | | 6.00 | OBJECT PLANE | | |
| 1 | | 3.20 | ENTRANCE PUPIL PLANE | | |
| 2 | infinity | 2.50 | 1.4938 | 57.0 | |
| 3 | −2.50 | 3.00 | AIR | | −.64 |
| 4 | infinity | 2.00 | 1.4938 | 57.0 | |
| 5 | −26.00 | 24.70 | AIR | | 57.00 |
| 6 | infinity | 2.00 | 1.4938 | 57.0 | |
| 7 | −9.20 | 25.00 | AIR | | −1.00 |
| 8 | −4.30 | 1.20 | 1.5901 | 29.6 | −.30 |
| 9 | infinity | 2.00 | 1.4938 | 57.0 | |
| 10 | −3.61 | 28.35 | AIR | | −.70 |
| 11 | | | IMAGE PLANE | | |

EFL = −5.599
.020 N.A.
60 DEG F.O.V.
MAGN = 1.000

TABLE IX

| SURF | RD | TH | INDEX | v-VALUE | CC |
|------|----------|-------|--------|---------|-------|
| 0 | | 3.00 | OBJECT PLANE | | |
| 1 | | 2.40 | ENTRANCE PUPIL PLANE | | |
| 2 | 12.40 | 3.00 | 1.4938 | 57.0 | |
| 3 | −2.32 | 9.70 | AIR | | −.80 |
| 4 | −7.60 | 2.00 | 1.4938 | 57.0 | |
| 5 | −8.10 | 15.90 | AIR | | 2.80 |
| 6 | infinity | 2.00 | 1.4938 | 57.0 | |
| 7 | −10.00 | 28.50 | AIR | | −1.20 |
| 8 | −24.00 | 1.20 | 1.5901 | 29.6 | 70.00 |
| 9 | 5.00 | 2.50 | 1.4938 | 57.0 | |
| 10 | −6.36 | 29.82 | AIR | | |
| 11 | | | IMAGE PLANE | | |

EFL = −4.891
.025 N.A.
60 DEG F.O.V.
MAGN = 2.000

TABLE X

| SURF | RD | TH | INDEX | v-VALUE | AD | AE |
|------|----------|-------|--------|---------|-------|---------|
| 0 | | 8.00 | OBJECT PLANE | | | |
| 1 | | .10 | ENTRANCE PUPIL PLANE | | | |
| 2 | infinity | 3.80 | 1.8126 | 25.2 | | |
| 3 | infinity | 1.80 | 1.7762 | 49.3 | | |
| 4 | −4.30 | .20 | AIR | | | |
| 5 | 11.40 | 1.50 | 1.7762 | 49.3 | | |
| 6 | −17.00 | 10.00 | AIR | | | |
| 7 | infinity | 2.00 | 1.7762 | 49.3 | | |
| 8 | −18.90 | 40.30 | AIR | | | |
| 9 | 13.00 | 2.00 | 1.8550 | 23.6 | | |
| 10 | 8.50 | 2.50 | 1.4985 | 81.2 | | |
| 11 | −19.30 | 39.80 | AIR | | | |
| 12 | infinity | 2.00 | 1.7762 | 49.3 | | |
| 13 | −8.34 | 20.00 | AIR | | | |
| 14 | infinity | 2.00 | 1.7044 | 29.8 | | |
| 15 | −8.83 | 14.04 | AIR | | 9.0E−4 | |
| 16 | | | IMAGE PLANE | | | 112.0E−5 |

EFL = 3.792
.025 N.A.
80 DEG F.O.V.
MAGN = −.500

TABLE XI

| SURF | RD | TH | INDEX | v-VALUE |
|---|---|---|---|---|
| 0 | | 12.00 | OBJECT PLANE | |
| 1 | | .10 | ENTRANCE PUPIL PLANE | |
| 2 | infinity | 4.50 | 1.8126 | 25.2 |
| 3 | infinity | 2.00 | 1.7762 | 49.3 |
| 4 | −4.30 | .20 | AIR | |
| 5 | 38.00 | 1.50 | 1.7762 | 49.3 |
| 6 | −14.00 | 15.00 | AIR | |
| 7 | infinity | 1.60 | 1.7762 | 49.3 |
| 8 | −14.00 | 27.00 | AIR | |
| 9 | 50.00 | 1.20 | 1.8550 | 23.6 |
| 10 | 4.50 | 3.00 | 1.4985 | 81.2 |
| 11 | −4.70 | 28.80 | AIR | |
| 12 | infinity | 2.00 | 1.7762 | 49.3 |
| 13 | −11.00 | 26.70 | AIR | |
| 14 | infinity | 2.00 | 1.7662 | 49.3 |
| 15 | −9.90 | 27.30 | AIR | |
| 16 | −14.70 | 2.00 | 1.7662 | 49.3 |
| 17 | −8.00 | 40.70 | AIR | |
| 18 | infinity | 2.00 | 1.7662 | 49.3 |
| 19 | −20.33 | 50.40 | AIR | |
| 20 | | | IMAGE PLANE | |

EFL = −5.737
.017 N.A.
60 DEG F.O.V.
MAGN = .500

TABLE XII

| 1 FIG. | 2 N.A. | 3 FOV | 4 M | 5 EPD | 6 El. | 7 Relay | 8 sC | 9 Dist | 10 Ptz | 11 WavFr | 12 AxClr |
|---|---|---|---|---|---|---|---|---|---|---|---|
| 1 | 0.020 | 60 | 1.0 | −0.5 | 3 | 1 | 1.62 | −2 | 0.54 | 0.79 | 0.90 |
| 2 | 0.020 | 60 | 1.0 | 0.6 | 3 | 1 | 1.15 | −2 | 0.40 | 0.32 | 0.80 |
| 3 | 0.020 | 60 | 1.0 | 6 | 3 | 1 | 0.55 | −1 | 0.18 | 0.10 | 0.21 |
| 4 | 0.020 | 60 | 1.0 | 2 | 3 | 1 | 0.99 | +2 | 0.20 | 0.27 | 0.31 |
| 5 | 0.015 | 70 | 1.0 | 0.2 | 5 | 1 | 0.84 | −16 | 0.25 | 0.31 | 0.12 |
| 6 | 0.025 | 60 | 0.0 | 3.2 | 4 | 1 | 0.96 | −3 | 0.23 | 0.46 | 0.14 |
| 7 | 0.020 | 70 | 1.0 | 1.9 | 4 | 1 | 0.72 | −6 | 0.24 | 0.27 | 0.63 |
| 8 | 0.025 | 60 | 1.0 | 3.2 | 5 | 1 | 1.06 | −1 | 0.19 | 0.21 | 0.31 |
| 9 | 0.025 | 60 | 2.0 | 2.4 | 5 | 1 | 1.47 | +0 | 0.23 | 0.15 | 0.03 |
| 10 | 0.025 | 80 | −0.5 | 0.1 | 7 | 2 | 1.03 | −2 | 0.33 | 0.31 | 0.35 |
| 11 | 0.017 | 60 | 0.5 | 0.1 | 9 | 3 | 1.51 | −11 | 0.36 | 0.48 | 0.04 |

Column 1 Figure number.
Column 2 Numerical aperture at the output focal plane.
Column 3 Total field of view at the object side, in degrees.
Column 4 Magnification.
Column 5 Entrance pupil distance (air equivalent value), in mm.
Column 6 Number of elements with optical power.
Column 7 Number of image relays.
Column 8 Sum of the absolute values of all curvatures (i.e., the sum of the absolute values of the reciprocals of the radii of curvature), in units of 1/mm.
Column 9 Maximum image distortion in percent.
Column 10 Petzval sum of the total system, in units of 1/mm.
Column 11 Monochromatic peak to valley wavefront deformation over the whole field and unvignetted aperture.
Column 12 Axial chromatic aberration in waves.

Having thus described the invention I claim:

1. A color corrected optical endoscope system comprising a plurality of optical elements, comprising:
   an objective element; and
   a relay system providing substantially all color correction for said endoscope system using at least one curved optical interface providing color correction, said objective element and said relay system optically aligned to transfer an image from an input plane of said objective element to an output plane of said endoscope system, each of said plurality of optical elements being uniformly refractive, wherein said objective element and said relay system includes no meniscus lenses and not more than 2 concave surfaces.

2. The endoscope system of claim 1, wherein said objective element and said relay system together have an axial chromatic aberration of less than about 0.21 waves.

3. The endoscope system of claim 1, wherein said objective element and said relay system together have a monochromatic wavefront deformation of less than about 0.31 waves.

4. The endoscope system of claim 1, wherein said objective element and said relay system together have a monochromatic wavefront deformation of less than about 0.27 waves.

5. The endoscope system of claim 1, further comprising two additional relay systems.

6. The endoscope system of claim 5, wherein each of said two additional relay systems have 2 or fewer lens elements.

7. A color corrected optical endoscope system comprising a plurality of optical elements, comprising:
   an objective element; and
   a relay system providing substantially all color correction for said endoscope system using at least one curved optical interface providing color correction, said objective element and said relay system optically aligned to transfer an image from an input plane of said objective element to an output plane of said endoscope system, each of said plurality of optical elements being uniformly refractive, wherein said objective element and said relay system include not more than 2 concave surfaces and not more than 1 element of negative optical power.

8. The endoscope system of claim 7, wherein said objective element and said relay system together have an axial chromatic aberration of less than about 0.21 waves.

9. The endoscope system of claim 7, wherein said objective element and said relay system together have a monochromatic wavefront deformation of less than about 0.31 waves.

10. The endoscope system of claim 7, wherein said objective element and said relay system together have a monochromatic wavefront deformation of less than about 0.27 waves.

11. The endoscope system of claim 7, further comprising two additional relay systems.

12. The endoscope system of claim 11, wherein each of said two additional relay systems have 2 or fewer lens elements.

* * * * *